Patented Mar. 23, 1954

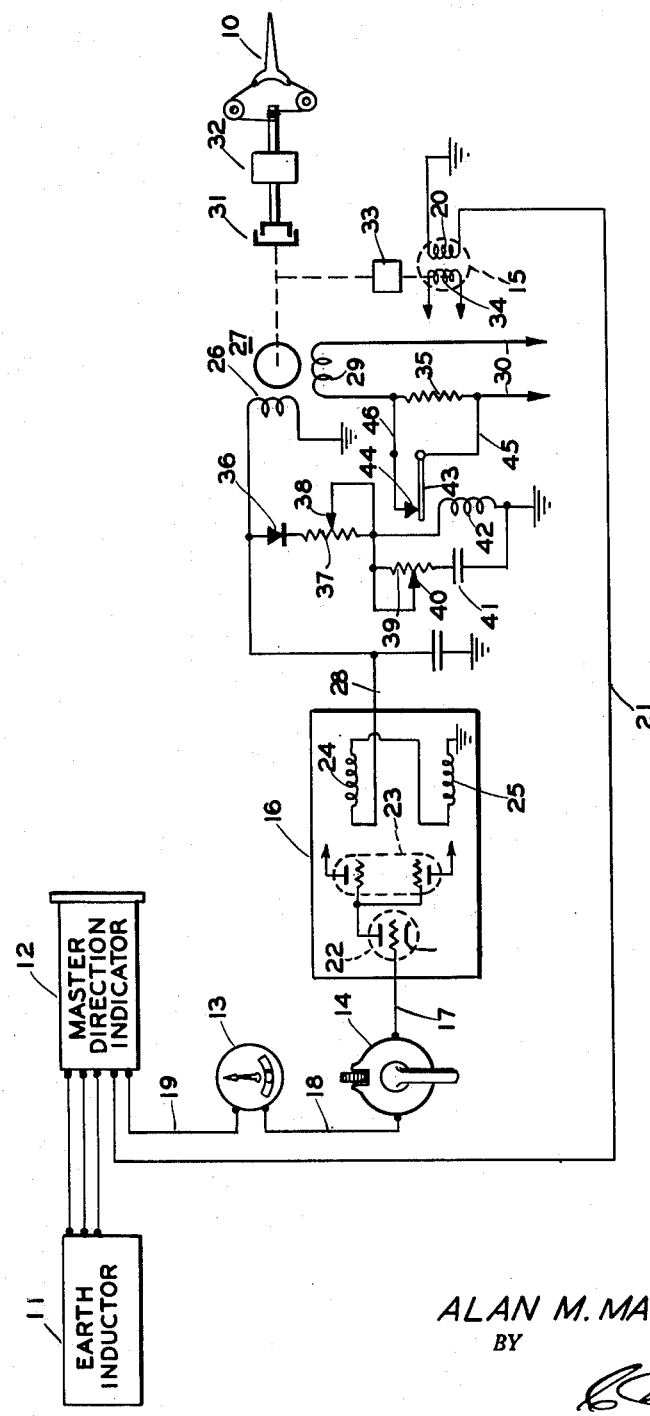

2,673,314

UNITED STATES PATENT OFFICE 2,673,314

POSITIONING SYSTEM MONITOR

Alan M. MacCallum, Maywood, N. J., assignor to Bendix Aviation Corporation, Teterboro, N. J., a corporation of Delaware Application May 3, 1950, Serial No. 159,785

9 Claims. (Cl. 318—28)

The present invention relates generally to safety or monitoring apparatus for positioning systems and more particularly to apparatus of this general character adapted for preventing improper control of an aircraft by an automatic pilot system due to hard-over signals resulting from loss of follow-up and the presence of sustained or persisting control signals.

All electric automatic pilot systems for aircraft currently in use generally comprise a three channel control arrangement, each channel, in turn, generally consisting of a displacement and trim signal generator for controlling a surface servomotor together with an electric follow-up signal generator for modifying the operation of the motor and thus overcoming oscillatory control of the aircraft. In these arrangements which have been designed as closed loop systems, loss of electric follow-up will result in hard-over signals being applied to a control surface so as to cause the craft to oscillate undesirably about a predetermined flight position. The hard-over signals may be developed in the absence of follow-up not only by the control signal generators which are generally arranged in a series signal chain in each channel but in the event of an opening in the wiring of the signal chain stray voltages may be picked up to undesirably operate the control surface.

The present invention contemplates the provision of novel means whereby the servomotors of an automatic pilot system are made ineffective to operate their related control surfaces during the existence of hard-over signals. The signals normally operating an automatic pilot system are generally temporary in character so that upon the occurrence of a sustained maximum signal abnormal operation of the servomotor will occur. In response to the sustained signal, novel means operate to make the motor ineffective either by automatically reducing the power input to the motor or de-clutching the motor from its surface.

An object of the present invention, therefore, is to provide a novel safety arrangement for monitoring the operation of a positioning system.

A further object of the invention is to provide a novel safety arrangement for an aircraft automatic pilot system to prevent automatically improper operation of the system.

Another object is to provide in an automatic pilot system for aircraft novel means sensitive to hard-over signals developed by the system for making the latter ineffective on the aircraft.

A still further object of the invention is to provide in an aircraft automatic pilot system, which during abnormal operation is adapted to generate hard-over signals for controlling the aircraft in an improper and undesirable manner, novel means responsive to such hard-over signals, as distinguished from normal craft control signals, for making the pilot system ineffective on the aircraft.

The above and other objects and advantages of the invention will appear more fully hereinafter from a consideration of the detailed description which follows when taken together with the accompanying drawing wherein one embodiment of the invention is illustrated. It is to be expressly understood, however, that the drawing is for the purpose of illustration and description only and is not designed as a definition of the limits of the invention.

The single figure of the drawing is a diagrammatic illustration of one embodiment of the novel safety apparatus of the present invention for monitoring the operation of an aircraft automatic pilot.

Referring now to the single figure of the drawing for a more detailed description of the novel safety arrangement of the present invention, the latter is shown as applied to the rudder channel of a conventional all electric, three axes of control aircraft automatic pilot, the safety arrangement for the aileron and elevator channels being the same as that shown in connection with the rudder channel. The channel illustrated generally comprises for the control of a rudder 10, a compass consisting of a stabilized earth inductor element 11 and a master direction indicator 12 which receives and reproduces for control purposes the signals of element 11. In addition to the compass signal, rate of turn, course-turn and follow-up signals are developed by a rate of turn device 13, a turn signal generator incorporated in a manual turn control unit 14 and an inductive follow-up device 15.

The various signal generators are arranged in a series connected signal chain with the turn signal generator of manual control unit 14 being connected to the input of an amplifier 16 by way of a lead 17 and to the rate signal developing device by way of a lead 18. The rate signal device, on the other hand, connects with the compass signal transmitter located within indicator 12 by way of a lead 19, the transmitter, in turn, connecting with one side of a fixed wound stator 20 of follow-up device 15 by way of a lead 21, the opposite side of the stator being grounded.

Amplifier 16 generally comprises an input amplification stage schematically represented by a tube 22 and a discriminator stage represented by a double triode tube 23. The latter stage includes a magnetic amplifier having series opposed connected output windings 24 and 25, the latter winding being grounded as shown and the other winding being connected to a grounded variable phase winding 26 of a two-phase induction motor 27 by way of a lead 28, the second or fixed phase winding 29 of the motor being connected by leads 30 to a suitable source of alternating current. Depending upon the phase and amplitude of the control signal applied to the amplifier input, the motor will operate in one direction or another. For a more detailed description of the amplifier and its operation, reference is made to copending application Serial No. 516,488, filed December 31, 1943, now U. S. Patent No. 2,625,348 issued January 13, 1953.

Motor 27 drivably connects through an electromagnetic clutch 31 and a gear reduction mechanism 32 with the rudder surface and through a gear reduction mechanism 33 with the movable wound rotor 34 of inductive follow-up device 15.

When the above described system is operating normally the control signals developed by master direction indicator 12, turn rate signal developing device 13 or manual control unit 14 are of relatively temporary character. As a result of these signals the motor operates to position the surface and in doing so displaces wound rotor 34 of follow-up 15 relative to its stator so that a follow-up signal is developed in the latter to "wash-out" the control signal or signals at which time the surface has been deflected to an applied position and the motor stops. Inasmuch as the applied surface returns the craft to a predetermined reference position or to a preselected and new position the control signals diminish and the follow-up signal assumes primary control of the motor to reverse operation of the latter and thereby return the applied surface to a normal or trailing position. In this manner substantially "dead-beat" control of the aircraft is acquired.

Because the automatic pilot systems of the character described are complex and incorporate a considerable amount of electrical wiring, open leads or grounds may occur in the signal chain due to worn or defective wiring. In this manner the follow-up signal of device 15 may be lost and the broken leads may pick up stray voltages other than the desired control signals resulting in hard-over and undesirable craft control. The servo power available from the pilot may be great enough to damage the aircraft structure if a sustained hard-over servo rotation is applied. To overcome this disadvantage, it has been proposed to place a series resistance, such as resistor 35, in the fixed phase of the servomotor, to limit the power input to the motor and thus the torque available from the servomotor. While this expedient does effectively prevent structural damage due to hard-overs, it limits the static sensitivity of the pilot system thus reducing the efficiency of the system in the presence of static friction.

In accordance with the present invention, therefore, novel means are provided for eliminating the above undesirable effect while retaining most of the advantages obtained by the series resistor. To this end, therefore, a half wave rectifier 36 is connected with lead 28 and a resistor 37 is connected in series with the rectifier, a slidable contact 38 engaging the resistor and connecting with the free end thereof. The free end of resistor 37 communicates with two parallel paths, one constituting a resistor 39, engaged by a slidable contact 40, and a condenser 41 and the other path constituting a relay winding 42. The free end of the latter winding is grounded as shown and the grounded end of the winding also connects with one side of the condenser.

Relay winding 42 is operatively associated with a movable armature 43 and a fixed contact 44, the former connecting by way of a lead 45 with one end of resistor 35 and the latter connecting by way of a lead 46 with the opposite end of the resistor. When relay winding 42 is unenergized armature 43 is in engagement with contact 44 to thereby by-pass resistor 35 at which time full power is applied to fixed phase winding 29.

As heretofore indicated, a normal control signal is of relatively short duration while a hard-over signal is of a relatively long duration. The series connected resistor 39 and condenser 41 comprise a timing circuit so that in response to a normal control signal at the amplifier output a direct current is developed by rectifier 36 and the amount thereof to be passed to the timing circuit may be selected by contact 38. Since the resistor 39 and condenser 41 represent a much lower resistance than relay winding 42 the direct current selected by contact 38 as well as contact 40 will charge condenser 41. The condenser is designed so that after a predetermined interval of time, exceeding the time duration of a normal control signal, it becomes charged to capacity and thereafter blocks D. C. flow so that direct current thereafter must flow through relay winding 42 to energize the latter.

With energization of winding 42 armature 43 is disengaged from contact 44 whereby resistor 35 is placed in the fixed phase of the motor thereby reducing the power input to the motor. The resistor may be of sufficient value to make the motor ineffective so that the human pilot may take over manual control of the craft or, if desired, the relay may be connected to the winding of the clutch to disengage the motor from its surface. The time of charging for condenser 41 may be so chosen that sensitivity around null with respect to static friction loads is maintained but high torque from the servomotor is not available for a long enough period to damage the aircraft structure.

It will now be apparent to those skilled in the art that novel means have been provided by the present invention whereby in response to hard-over signals developed by an aircraft automatic pilot as a result of abnormal operation thereof the pilot is made ineffective to control the aircraft.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. A positioning system comprising a motor for driving a driven object, means which when operating normally develop a control signal for operating the motor and adapted when operating abnormally to develop a sustained signal, and means responsive to the first signal for providing full motor torque and responsive to the sustained signal for limiting the motor torque.

2. A positioning system comprising a motor for driving a driven object, control means which when operating normally develop a control signal having a predetermined time duration for operating the motor and which when operating abnormally develop a control signal having a time duration exceeding that of the first signal, and means responsive to the first signal for providing full motor torque and responsive to the second signal for limiting of the motor torque.

3. A positioning system comprising a motor for driving a driven object, control means which when operating normally develop a control signal having a predetermined time duration for operating the motor and which when operating abnormally develop a control signal having a time duration exceeding that of the first signal, means connecting said control means with said motor, and means associated with said connecting means responsive to the first signal for providing full motor torque and responsive to the second signal for limiting of the motor torque.

4. An aircraft automatic pilot comprising a motor for positioning a craft surface, a follow-up device operated by the motor for developing a follow-up signal, reference means for developing a signal corresponding to craft displacement from a prescribed position, means connecting the follow-up device and the reference means in a signal chain for operating the motor, the resulting signal of the signal chain during normal operation of the pilot not exceeding a predetermined time interval but during abnormal operation of the pilot exceeding said predetermined time interval, and means responsive to the resulting signal when the latter exceeds said predetermined time interval for making the motor ineffective on the surface.

5. An aircraft automatic pilot comprising a motor for positioning a craft surface, a follow-up device operated by the motor for developing a follow-up signal, reference means for developing a signal corresponding to craft displacement from a prescribed position, means connecting the follow-up device and the reference means in a signal chain for operating the motor, an amplifier having an input connected with the signal chain and an output connected with the motor, the resulting signal of the signal chain during normal operation of the pilot being of relatively short duration and providing normal motor control and during abnormal operation of the pilot being of relatively long duration and providing hard-over motor control, and means associated with the amplifier output and responsive to the resulting signal developed during normal operation of the pilot for providing full motor torque and responsive to the resulting signal developed during abnormal operation of the pilot for limiting the motor torque.

6. An aircraft automatic pilot comprising a motor having a power supply circuit for positioning a craft surface, a follow-up device operated by the motor for developing a follow-up signal, reference means for developing a signal corresponding to craft displacement from a prescribed position, means connecting the follow-up device and the reference means in a signal chain for operating the motor, an amplifier having an input connected with the signal chain and an output connected with the motor, the resulting signal of the signal chain during normal operation of the pilot being of relatively short duration and providing normal motor control and during abnormal operation of the pilot being of relatively long duration and providing hard-over motor control, control means operable in one manner for supplying full power from said circuit to said motor to provide full motor torque and operable in another manner for limiting the power supplied to said motor to limit motor torque, and means connected with said amplifier output and responsive to the resulting signal developed during normal operation of the pilot for operating said control means in said one manner and responsive to the resulting signal developed during abnormal operation of the pilot for operating said control means in said other manner.

7. An aircraft automatic pilot comprising a motor for positioning a craft surface, control means connected to said motor for developing a motor control signal during departure of the craft from a prescribed position, said control signal being of a character during normal pilot operation to provide normal motor control and during abnormal pilot operation being of a character to provide hard-over motor control, and means operative in response to the control signal during normal pilot operation to provide full motor torque and operable in response to abnormal pilot operation for limiting motor torque.

8. An aircraft automatic pilot comprising a motor for positioning a craft surface, control means connected to said motor for developing a motor control signal during departure of the craft from a prescribed position, said control signal being of a relatively short time duration during normal pilot operation to provide normal motor control and being of a relatively long time duration during abnormal pilot operation to provide hard-over motor control, means for making the motor ineffective on said surface, and timing means responsive to the long time duration signal for making said last-named means effective.

9. An aircraft automatic pilot comprising a surface positioning motor having a power supply circuit therefor, control means connected to said motor for developing a motor control signal during departure of the craft from a prescribed position, said control signal being of a character during normal pilot operation to provide normal motor control and during abnormal pilot operation being of a character to provide hard-over motor control, resistance means connected with said power supply circuit for reducing the power available to the motor to thereby reduce motor torque, and means operative during normal pilot operation for shunting said resistance means whereby full power is available to the motor and responsive to the control signal during abnormal pilot operation for making said resistance effective in said circuit to thereby reduce motor torque.

ALAN M. MacCALLUM.

References Cited in the file of this patent
UNITED STATES PATENTS

| Number | Name | Date |
| --- | --- | --- |
| 1,705,728 | Harvey | Mar. 19, 1929 |
| 2,297,740 | Brown | Oct. 6, 1942 |
| 2,415,430 | Frische et al. | Feb. 11, 1947 |
| 2,450,907 | Newton et al. | Oct. 12, 1948 |
| 2,487,793 | Esval et al. | Nov. 15, 1949 |
| 2,546,555 | Meredith et al. | Mar. 27, 1951 |